US012429796B2

(12) United States Patent
Mugita et al.

(10) Patent No.: US 12,429,796 B2
(45) Date of Patent: Sep. 30, 2025

(54) IMAGE FORMING APPARATUS

(71) Applicant: CANON KABUSHIKI KAISHA, Tokyo (JP)

(72) Inventors: Naoki Mugita, Ibaraki (JP); Kota Kurokawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/740,106

(22) Filed: Jun. 11, 2024

(65) Prior Publication Data

US 2024/0411240 A1 Dec. 12, 2024

(30) Foreign Application Priority Data

Jun. 12, 2023 (JP) ................................. 2023-096154
Mar. 8, 2024 (JP) ................................. 2024-035619

(51) Int. Cl.
*G03G 15/06* (2006.01)
*G03G 15/02* (2006.01)

(52) U.S. Cl.
CPC ....... *G03G 15/065* (2013.01); *G03G 15/0266* (2013.01); *G03G 2215/00776* (2013.01)

(58) Field of Classification Search
CPC ......................... G03G 15/065; G03G 15/0266
USPC ............................................................ 399/55
See application file for complete search history.

(56) References Cited

U.S. PATENT DOCUMENTS

| | | | | |
|---|---|---|---|---|
| 9,977,372 | B2 * | 5/2018 | Okuyama | G03G 21/105 |
| 10,359,715 | B2 * | 7/2019 | Nakada | G03G 15/0275 |

FOREIGN PATENT DOCUMENTS

| | | | |
|---|---|---|---|
| JP | 2014-203040 | A | 10/2014 |
| JP | 2016-011981 | A | 1/2016 |
| JP | 2016-021043 | A | 2/2016 |
| JP | 2021-148944 | A | 9/2021 |

* cited by examiner

*Primary Examiner* — Hoan H Tran
(74) *Attorney, Agent, or Firm* — Venable LLP

(57) ABSTRACT

An image forming apparatus includes a developing bias applying portion that applies a developing bias including a direct current voltage and an alternating current voltage to a developer bearing member that bears toner. When a voltage on the same-polarity side of a charging polarity of the toner with respect to the direct current voltage out of the alternating current voltage is referred to as Vgo, the developing bias applying portion applies the developing bias to the developer bearing member so that as compared to a peak-to-peak voltage in a case where humidity is a first humidity, the peak-to-peak voltage in a case where humidity is a second humidity that is lower than the first humidity is greater, and so that the voltage Vgo in the case where humidity is the second humidity is the same as the voltage Vgo in the case where humidity is the first humidity.

10 Claims, 21 Drawing Sheets

FIG 11A

<TABLE 1>

| ENVIRONMENTAL HUMIDITY | DEVELOPING BIAS | COMPARATIVE EXAMPLE 1 | COMPARATIVE EXAMPLE 2 | FIRST EMBODIMENT |
|---|---|---|---|---|
| 80% | DUTY RATIO | 75% | 75% | 75% |
| | Vpp[V] | 1400 | 1400 | 1400 |
| | Vgo[V] | 1050 | 1050 | 1050 |
| 50% | DUTY RATIO | 75% | 75% | 71.2% |
| | Vpp[V] | 1400 | 1475 | 1475 |
| | Vgo[V] | 1050 | 1106 | 1050 |
| 5% | DUTY RATIO | 75% | 75% | 65.6% |
| | Vpp[V] | 1400 | 1600 | 1600 |
| | Vgo[V] | 1050 | 1200 | 1050 |

FIG 11B

<TABLE 2>

| | ENVIRONMENTAL HUMIDITY | COMPARATIVE EXAMPLE 1 | COMPARATIVE EXAMPLE 2 | FIRST EMBODIMENT |
|---|---|---|---|---|
| PERIODIC DENSITY UNEVENNESS | 80% | ○ | ○ | ○ |
| | 50% | △ | ○ | ○ |
| | 5% | × | ○ | ○ |
| FOG | 80% | ○ | ○ | ○ |
| | 50% | ○ | △ | ○ |
| | 5% | ○ | × | ○ |

FIG 16A

〈TABLE 3〉

| ENVIRONMENTAL HUMIDITY | DEVELOPING BIAS | COMPARATIVE EXAMPLE 1 | COMPARATIVE EXAMPLE 2 | FIRST EMBODIMENT | SECOND EMBODIMENT |
|---|---|---|---|---|---|
| 80% | DUTY RATIO | 75% | 75% | 75% | 75% |
| | Vpp[V] | 1400 | 1400 | 1400 | 1400 |
| | Vgo[V] | 1050 | 1050 | 1050 | 1050 |
| | Vback[V] | 150 | 150 | 150 | 150 |
| 50% | DUTY RATIO | 75% | 75% | 71.2% | 71.2% |
| | Vpp[V] | 1400 | 1475 | 1475 | 1475 |
| | Vgo[V] | 1050 | 1106 | 1050 | 1050 |
| | Vback[V] | 150 | 150 | 150 | 142 |
| 5% | DUTY RATIO | 75% | 75% | 65.6% | 65.6% |
| | Vpp[V] | 1400 | 1600 | 1600 | 1600 |
| | Vgo[V] | 1050 | 1200 | 1050 | 1050 |
| | Vback[V] | 150 | 150 | 150 | 130 |

FIG 16B

〈TABLE 4〉

| | ENVIRONMENTAL HUMIDITY | COMPARATIVE EXAMPLE 1 | COMPARATIVE EXAMPLE 2 | FIRST EMBODIMENT | SECOND EMBODIMENT |
|---|---|---|---|---|---|
| PERIODIC DENSITY UNEVENNESS | 80% | ○ | ○ | ○ | ○ |
| | 50% | △ | ○ | ○ | ○ |
| | 5% | × | ○ | ○ | ○ |
| FOG | 80% | ○ | ○ | ○ | ○ |
| | 50% | ○ | △ | ○ | ○ |
| | 5% | ○ | × | ○ | ○ |
| NUMBER OF ADHERING CARRIER | 80% | ○ | ○ | ○ | ○ |
| | 50% | ○ | ○ | △ | ○ |
| | 5% | ○ | ○ | × | ○ |

IMAGE FORMING APPARATUS

BACKGROUND OF THE INVENTION

Field of the Invention

This invention relates to an image forming apparatus that applies to a developer bearing member a developing bias in which a DC (direct current) voltage and an AC (alternating current) voltage are superimposed in order to develop an electrostatic latent image formed on an image bearing member with developer including toner.

Description of the Related Art

In an image forming apparatus that forms a toner image on a recording material, well known is the configuration in which a developing bias in which a DC voltage and an AC voltage are superimposed is applied to a developer bearing member that bears developer when developing an electrostatic latent image formed on the image bearing member.

Japanese Patent Application Laid-Open No. 2016-11981 discloses the configuration in which the duty ratio of the components of the side of the polarity (positive polarity) opposite to the polarity of normal charging polarity (negative polarity) is made higher to 50% or more than 50% to improve granularity on the image.

Recently, the image forming apparatus of an electrophotographic system is becoming widespread in the printing industry and the demand for high speed and high quality imaging is rapidly surging. The items of demands concerning high quality imaging include density evenness for an image on the same page, so that much importance is being placed on reducing image unevenness on the same page as much as possible.

The causes of such image unevenness are various. However, one of the causes is the lack of process precision, such as the eccentricity of a photosensitive drum or a developing sleeve, by which a developing gap is fluctuated to cause image unevenness.

The density unevenness on images in the image processing direction (hereinafter referred to as sub-scanning density unevenness) conspicuously occurs when the charging amount of the toner is large in a case such as low humidity environment. Japanese Patent Application Laid-Open No. 2016-21043 discloses the technology in which the density unevenness on images is reduced irrespective of the charging amount of the toner by changing the duty ratio and the peak-to-peak voltage Vpp of the developing bias based on the patch detection density on an intermediate transfer member.

However, when the peak-to-peak voltage Vpp of AC voltage components of the developing bias is made greater in order to improve the sub-scanning density unevenness in a low humidity environment, in which the charging amount of toner is large, the potential difference Vgo between the potential on developing side of AC voltage components and DC voltage components in the developing bias becomes greater so that toner fog may occur.

SUMMARY OF THE INVENTION

The purpose of the present invention is to suppress toner fog as well as to suppress density unevenness.

The first aspect of the present invention is an image forming apparatus comprising:

an image bearing member;

a charging portion that charges a surface of the image bearing member to a predetermined charging potential;

a latent image forming portion that forms an electrostatic latent image on the surface of the image bearing member charged by the charging portion to the predetermined charging potential;

a developer bearing member that bears developer including toner;

a developing bias applying portion that applies a developing bias to the developer bearing member to develop the electrostatic latent image formed on the image bearing member by the latent image forming portion using the developer borne by the developer bearing member, the developing bias including a direct current voltage and an alternating current voltage that are superimposed on each other; and a humidity sensor that detects humidity, wherein, when a voltage on the same-polarity side of a charging polarity of the toner with respect to the direct current voltage out of the alternating current voltage is referred to as Vgo, a voltage on the opposite-polarity side of the charging polarity of the toner with respect to the direct current voltage out of the alternating current voltage is referred to as Vre, and a peak-to-peak voltage of the alternating current voltage is referred to as Vgo+Vre, the developing bias applying portion applies the developing bias to the developer bearing member:

so that as compared to the peak-to-peak voltage in a case where humidity detected by the humidity sensor is a first humidity, the peak-to-peak voltage in a case where humidity detected by the humidity sensor is a second humidity that is lower than the first humidity is greater, and so that the voltage Vgo in the case where the humidity detected by the humidity sensor is the second humidity is the same as the voltage Vgo in the case where the humidity detected by the humidity sensor is the first humidity.

The second aspect of the present invention is an image forming apparatus comprising:

an image bearing member;

a charging portion that charges a surface of the image bearing member to a predetermined charging potential;

a latent image forming portion that forms an electrostatic latent image on the surface of the image bearing member charged by the charging portion to the predetermined charging potential;

a developer bearing member that bears developer including toner;

a developing bias applying portion that applies a developing bias to the developer bearing member to develop the electrostatic latent image formed on the image bearing member by the latent image forming portion using the developer borne by the developer bearing member, the developing bias including a direct current voltage and an alternating current voltage that are superimposed on each other; and a humidity sensor that detects humidity, wherein, when a voltage on the same-polarity side of a charging polarity of the toner with respect to the direct current voltage out of the alternating current voltage is referred to as Vgo, a voltage on the opposite-polarity side of the charging polarity of the toner with respect to the direct current voltage out of the alternating current voltage is referred to as Vre, a peak-to-peak voltage of the alternating current voltage is referred to as Vgo+Vre, and the duty ratio in one cycle of the alternating current voltage is referred to as Vgo/(Vgo+Vre), the developing bias applying portion applies the developing bias to the developer bearing member so that as compared to the peak-to-peak voltage in a case where humidity detected by the humidity sensor is a first humidity, the peak-to-peak voltage in a case where the humidity detected by the humidity sensor is a second humidity that is lower than the first humidity is greater, and so that the duty ratio in the case where humidity detected by the humidity sensor is the second humidity is less than the duty ratio in the case where humidity detected by the humidity sensor is the first humidity.

Further features of the present invention will become apparent from the following description of exemplary embodiments with reference to the attached drawings.

BRIEF DESCRIPTION OF THE DRAWINGS

FIGS. 11A and 11B are tables showing the configurations of the developing bias and the effects of periodic density unevenness and the fog in the configurations, according to the first embodiment of the present invention.

FIGS. 16A and 16B are tables showing the configurations of the developing bias and the effects of the periodic density unevenness and the fog in the configurations, according to the second embodiment of the present invention.

DESCRIPTION OF THE EMBODIMENTS

Hereinafter, with reference to the drawings, preferred embodiments of the present invention will be described in detail. The components of the embodiments described below are only examples and the configurations and various conditions such as functions, sizes, materials, shapes and relative arrangement can be appropriately changed in the range not departing from the gist of the present invention and they are not limited to ones in the following embodiments.

First Embodiment

Figure 1:
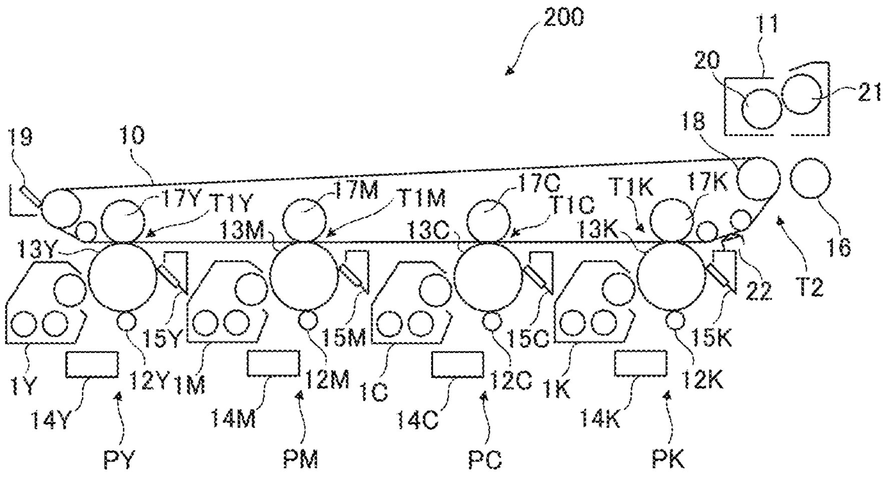
FIG. 1 is a schematic diagram showing the configuration of an image forming apparatus of electrophotographic system, according to the first embodiment of the present invention.

FIG. 1 is a diagram showing the configuration of the image forming apparatus according to the first embodiment of the present invention.

In FIG. 1, the image forming apparatus 200 is a full color printer with an electrophotographic system that has the four image forming portions PY, PM, PC, and PK provided according to the four colors of yellow, magenta, cyan, and black. In the present embodiment, a tandem type is adopted in which the image forming portions PY, PM, PC, and PK are arranged along the rotating direction of the intermediate transfer belt 10, which will be described later. The image forming apparatus 200 forms a toner image on a recording material according to an image signal from a document reading apparatus (not shown) connected to the main body of the image forming apparatus or hosts such as personal computers communicatively connected to the main body of the image forming apparatus. The recording materials include sheet material such as paper, plastic film, and cloth.

Next, the outline of the image forming process of the image forming apparatus 200 will be described. First, in the image forming portions PY, PM, PC, and PK, toner images of the respective colors are formed on the photosensitive drums 13Y, 13M, 13C, and 13K, respectively. The toner images of respective colors formed in this way are transferred on the intermediate transfer belt 10, and subsequently transferred from the intermediate transfer belt 10 to a recording material. The recording material on which an image is transferred is transferred to the fixing device 11 where the toner image is fixed to the image recording material.

Next, the configuration of the image forming apparatus 200 will be described in detail. The four image forming portions PY, PM, PC, and PK have substantially the same configuration as each other except for the developing colors. Therefore, hereinafter the description will be made for the image forming portion PY as the representative, and components of the configurations of the other image forming portions are indicated by replacing the index "Y" of the reference character of the components of the image forming portion PY with "M", "C", and "K", respectively, and the descriptions of the components are omitted.

In the image forming portion PY, the photosensitive drum 13Y is disposed. The photosensitive drum 13Y is a cylindrical photosensitive member as an image bearing member. Around the photosensitive drum 13Y, the charging roller 12Y as a charging device (charging portion), the developing device 1Y as a developer accommodating portion, the primary transfer roller 17Y, and the cleaning device 15Y are disposed. Under the photosensitive drum 13Y in the figure, the laser scanner 14Y as an exposing device (latent image forming portion) is disposed.

The charging roller 12Y is driven to rotate by the photosensitive drum 13Y during image forming. The charging roller 12Y is urged by the pressure spring (not shown) toward the photosensitive drum 13Y. Further, a charging bias is applied to the charging roller 12Y from a high voltage power supply. As a result, the photosensitive drum 13Y is substantially uniformly charged by the charging roller 12Y.

The intermediate transfer belt 10 is disposed opposed to the photosensitive drums 13Y, 13M, 13C, and 13K.

In the positions opposed to the photosensitive drums 13Y, 13M, 13C, and 13K, the primary transfer rollers 17Y, 17M, 17C, and 17K as primary transfer members are respectively disposed via the intermediate transfer belt 10. These configurations respectively form the primary transfer portions T1Y, T1M, T1C, and T1K, which transfer toner images formed on the photosensitive drums 13Y, 13M, 13C, and 13K to the intermediate transfer belt 10.

The intermediate transfer belt 10 is tensioned by the tension rollers and is driven to circularly move by the driving roller which is one of the tension rollers. The secondary transfer outer roller 16 as a secondary transfer member is disposed in the position opposed to the secondary transfer inner roller 18, which is one of the tension rollers, via the intermediate transfer belt 10, which forms the secondary transfer portion T2 that transfers a toner image on the intermediate transfer belt 10 to a recording material. The fixing device 11 is disposed downstream of the secondary transfer portion T2 in the conveying direction of recording material.

At the lower portion of the image forming apparatus 200, a feeding portion (not shown) is disposed. The recording material fed from the feeding portion at the start of the image forming operation is conveyed to the secondary transfer portion T2 at a predetermined timing.

Next, the image forming process of the image forming apparatus 200 configured as described above will be described.

When the image forming operation is started, the surface of the rotating photosensitive drum 13Y is uniformly charged by the charging roller 12Y. Next, the photosensitive drum 13Y is irradiated with a laser beam emanated from the exposing device 14Y corresponding to an image signal. As a result, an electrostatic latent image corresponding to the image signal is formed on the photosensitive drum 13Y. The electrostatic latent image on the photosensitive drum 13Y as an electrostatic latent image bearing member is visualized into a visible image by toner accommodated in the developing device 1Y.

The toner image formed on the photosensitive drum 13Y is primarily transferred onto the intermediate transfer belt 10 by the primary transfer portion T1Y. The toner remaining on the surface of the photosensitive drum 13Y after the primary transfer (after-transfer residual toner) is removed by the cleaning device 15Y. Such an operation is subsequently performed in the image forming portions for the colors, magenta, cyan, and black, so that the four color toner images are superimposed on the intermediate transfer belt 10.

Thereafter, a recording material accommodated in a recording material accommodating cassette (not shown) of the feeding portion is conveyed to the secondary transfer portion T2 in synchronism with the timing of the formation of a toner image and the four-color toner image on the intermediate transfer belt 10 is secondarily transferred on the recording material in a batch. The toner remaining on the intermediate transfer belt 10 that has not been fully transferred at the secondary transfer portion T2 is removed by the intermediate transfer belt cleaner 19.

Then, the recording material is conveyed to the fixing device 11. The fixing device 11 has the fixing roller 20, which has a heat source such as a halogen heater inside, and the pressure roller 21. The fixing roller 20 and the pressure roller 21 form a fixing nip portion. The toner image is fixed when the recording material conveyed to the fixing device 11 passes through the fixing nip portion, and then the recording material is discharged out of the apparatus.

This completes the series of image forming processes. By using only a desired image forming portion or desired image forming portions, a monochrome image with a desired color or a multi-color image with desired colors can be formed.

Next, two-component developing agent used in the present embodiment will be described. The developer to be used contains a mixture of nonmagnetic toner, which has a negative charge polarity, and magnetic carrier, which has a positive charge polarity. In the present embodiment, the charge polarity of the properly charged toner is negative. Non-magnetic toner is made by encapsulating colorants, wax components, etc., in resins such as polyester, styrene acrylic, etc., grinding or polymerizing them into powder, and adding fine powders such as titanium dioxide and silica to the surface. The magnetic carrier is made by coating with resin the surface layer of a core consisting of ferrite particles or resin particles mixed with magnetic powder.

Next, the detailed configuration of the developing device 1Y will be described. The developing devices 1M, 1C, and 1K have the same configuration as that of the developing device 1Y.

Figure 2:
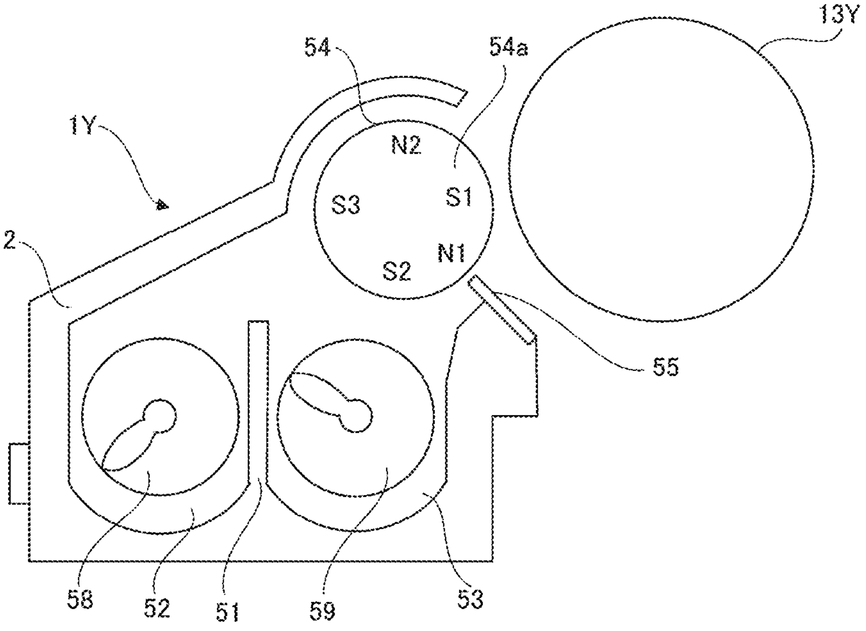
FIG. 2 is a schematic diagram showing a cross-sectional view of the developing device and the photosensitive drum in FIG. 1, according to the first embodiment of the present invention.
Figure 3:
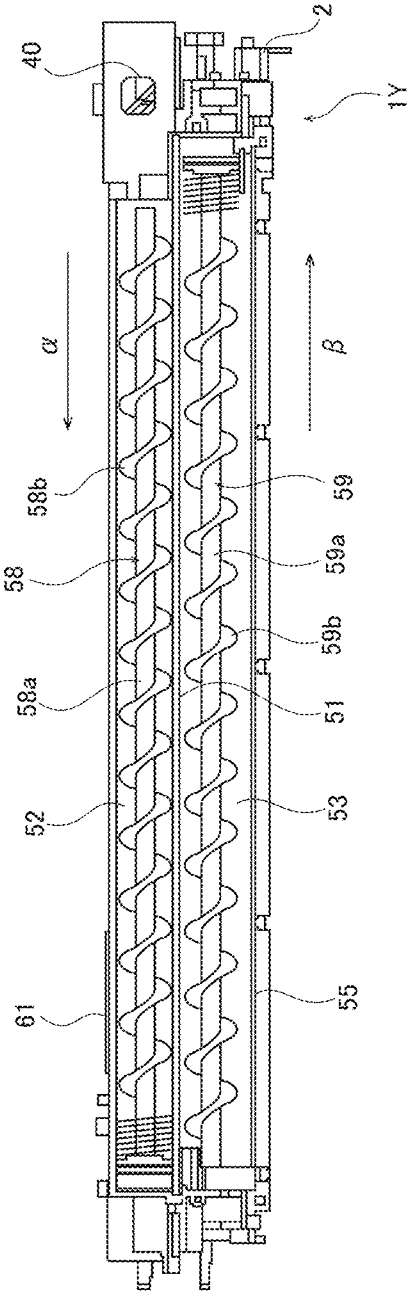
FIG. 3 is a diagram showing a plan view of the developing device, a part of which is omitted in FIG. 1, according to the first embodiment of the present invention.

FIG. 2 is a schematic diagram showing a cross-sectional view of the developing device 1Y and the photosensitive drum 13Y in FIG. 1. FIG. 3 is a diagram showing a plan view of the developing device 1Y in FIG. 1, a part of which is omitted.

In FIGS. 2 and 3, the developing device 1Y includes the developing container 2 that accommodates developer consisting of magnetic carrier and non-magnetic toner, and the developing sleeve 54 as a developer bearing member that bears and conveys the developer in the developing container. The surface of the developing sleeve 54 is held to be rotatable, while the magnetic roller 54*a*, which consists of a plurality of magnetic poles (S1, S2, S3, N1, and N2), is arranged such that the magnetic roller 54*a* cannot be rotated.

The developing container 2 is divided by the partition wall 51 into the first conveying path (agitating chamber) 52 as a first chamber and the second conveying path (developing chamber) 53 as a second chamber. The first conveying path 52 and the second conveying path 53 are communicated with each other by communicating openings at both end portions. As a result, the first conveying path 52 and the second conveying path 53 form a circulating path of the developer.

In the developing container 2, two screw members are provided as conveying members that convey the developer while agitating it. The first conveying screw 58 (first conveying portion) is provided on the first conveying path 52 and the second conveying screw 59 (second conveying portion) is provided on the second conveying path 53. The first conveying screw 58 and the second conveying screw 59 respectively have the rotating shafts 58*a*, 59*a* and the blades 58*b*, 59*b* spirally provided around the rotating shafts 58*a*, 59*a* (on the rotating shafts).

When the first conveying screw 58 rotates around the rotating shaft 58*a*, the spiral blade 58*b* conveys the developer in the first conveying path 52 in the direction of arrow α (first direction), which is one of the longitudinal directions of the developing device 1Y (axial directions of the rotating shaft 58*a*). When the second conveying screw 59 rotates around the rotating shaft 59*a*, the spiral blade 59*b* conveys the developer in the second conveying path 53 in the direction of arrow β (second direction), which is the other of the longitudinal directions of the developing device 1Y (axial directions of the rotating shaft 59*a*). As a result, the developer is circulated between the first conveying path 52 and the second conveying path 53.

The developer in the second conveying path 53 is scooped up to within the range of magnetic force of the pole S2 by the second conveying screw 59 provided in the second conveying path 53 under the developing sleeve 54 to be borne on the surface of the developing sleeve 54. The borne developer is conveyed with the rotation of the surface of the developing sleeve 54. The restricting blade 55 is disposed distanced from the surface of the developing sleeve 54 for a predetermined gap in the vicinity of the magnetic pole N1 of the developing sleeve 54 as a member for forming a thin layer of the developer. The gap between the developing sleeve 54 and the restricting blade 55 is generally set to 200 to 500 μm and the wider the gap is, more developer is borne on the developing sleeve 54.

The conveyed developer forms the magnetic brush at the pole N1 and the desired amount of developer is formed as a thin layer on the surface of the developing sleeve 54 by the restricting blade 55 provided with a predetermined gap from the developing sleeve 54. Thereafter, the developer conveyed to the opposing portion of the photosensitive drum 13Y forms the magnetic brush again at the pole S1 and forms a developing nip between the photosensitive drum 13Y and the developing sleeve 54.

The surface of the photosensitive drum 13Y is charged by the charging roller 12Y to a predetermined potential while the image portion is exposed by the exposure device 14Y to form the exposure potential. Further, a developing bias is applied to the developing sleeve 54 by a high voltage circuit (not shown). The developing bias to be applied to the developing device 54 will be described in detail later.

The toner charged in the developing device 1Y receives a driving force by the potential difference between the developing bias and the drum surface in the developing nip so that the toner adheres to the exposed portion. This completes the developing process.

The carrier and the toner that is not used for development are conveyed further downstream of the developing sleeve 54 in the rotating direction, lose a magnetic binding force in the zero-gauss area (area in which magnetic flux density is zero) formed between the pole S2 and the pole S3, and are collected in the second conveying path 53.

The image forming apparatus 200 according to the present embodiment is configured to develop an electrostatic latent image by AC development in which a developing bias consisting of DC voltage components and AC voltage components, obtained from AC voltage being superimposed to DC voltage is applied to the developing sleeve 54.

Next, the principle of AC development used when the image forming apparatus 200 according to the present embodiment develops an electrostatic latent image formed on the photosensitive drum 13Y will be described referring to FIGS. 4 and 5.

Figure 4:
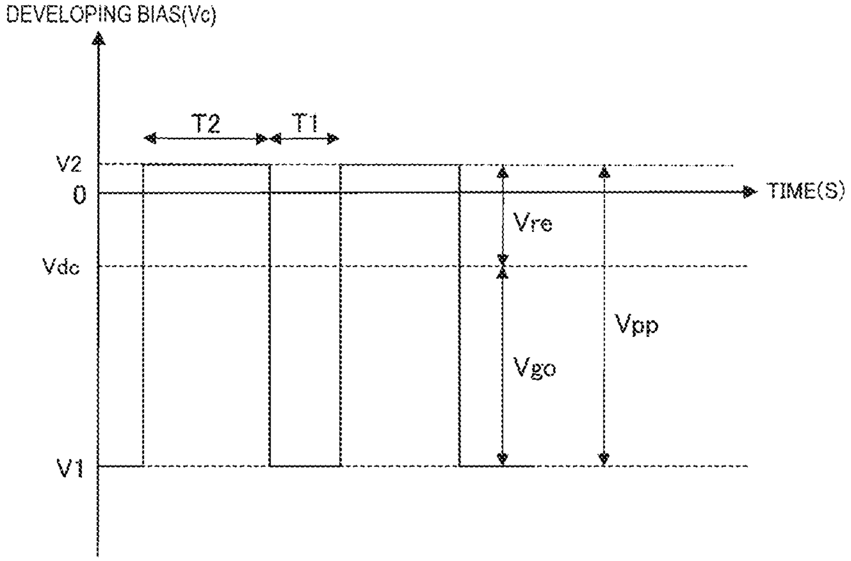
FIG. 4 is a diagram showing a graph showing a change with passage of time in a developing bias applied to the developing sleeve in FIG. 2, according to the first embodiment of the present invention.

FIG. 4 is a graph showing changes with the passage of time, of developing bias to be applied to the developing sleeve 54 of FIG. 2. The image forming apparatus 200 according to the present embodiment is configured to apply to the developing sleeve 54 an AC voltage with a maximum voltage value being V2 (V) and the minimum voltage value being V1 (V) as a developing bias such that the peak-to-peak voltage Vpp, which is the potential difference between the maximum voltage value and the minimum voltage value of the AC voltage, becomes V2−V1 (V). As described above, the charging polarity of the toner charged properly is negative. Therefore, in the present embodiment, the value of the AC voltage that is on the opposite polarity side of the toner charging polarity with respect to the charging potential Vd of the photosensitive drum (i.e., the surface potential of the non-image portion, the predetermined charging potential) is the maximum voltage value V2 of the AC voltage. In the present embodiment, the voltage value on the same polarity side as the toner charging polarity with respect to the charging potential Vd of the photosensitive drum is the minimum voltage value V1 of the AC voltage.

The ratio of the application time of the maximum voltage value V2 in one AC voltage cycle (hereinafter referred to as "duty ratio") is calculated by T2/(T1+T2), where T1 (s) is the application time of the minimum voltage value V1 and T2 (s) is the application time of the maximum voltage value V2.

In this case, the potential difference Vgo between the minimum voltage value V1 of the AC voltage and the DC voltage Vdc, the potential difference Vre between the maximum voltage value V2 of the AC voltage and the DC voltage Vdc, the duty ratio, and the peak-to-peak voltage Vpp have the relationship that satisfies the following two formulae to offset the effect on the DC voltage even when the peak-to-peak voltage Vpp is changed. The application time T1 of the minimum voltage value V1 of the AC voltage corresponds to the application time of the potential difference Vgo in one AC voltage cycle. The application time T2 of the maximum voltage value V2 of the AC voltage corresponds to the application time of the potential difference Vre in one AC voltage cycle.

$$\text{Duty ratio} = Vgo/Vpp \quad \text{(Formula 1)}$$

$$Vpp = Vgo + Vre \quad \text{(Formula 2)}$$

Figure 5A:
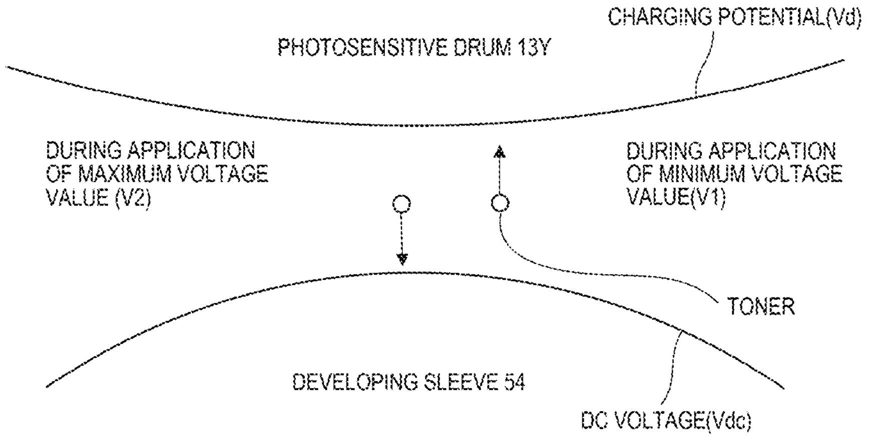
FIGS. 5A and 5B are explanatory diagrams showing the directions of electrostatic forces applied to toner and carrier, respectively, when a developing bias is applied, according to the first embodiment of the present invention.
Figure 5B:
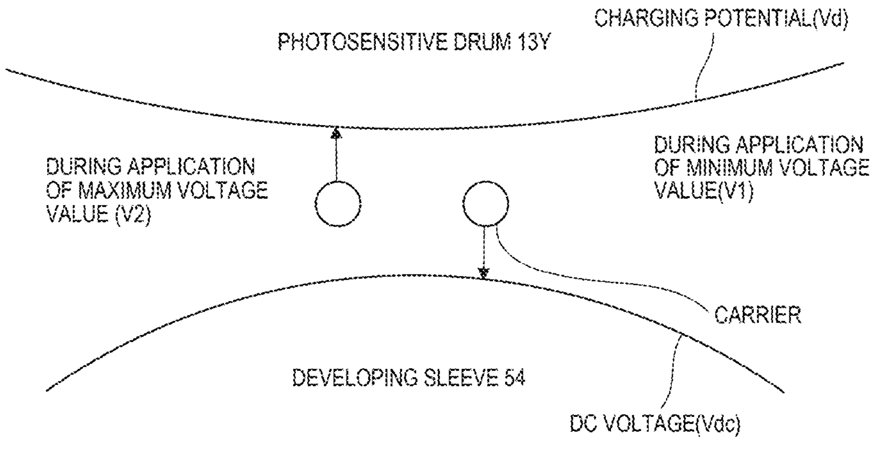

FIG. 5A is an explanatory diagram showing the directions of electrostatic forces applied to toner when a developing bias is applied. FIG. 5B is an explanatory diagram showing the directions of electrostatic forces applied to carrier when a developing bias is applied.

As shown in FIG. 5A, when the developing bias is the minimum voltage value V1, which is the developing side potential (the potential of the same polarity side as the toner charging polarity with respect to the charging potential Vd of the surface of the photosensitive drum 13Y), the toner receives electrostatic forces toward the photosensitive drum 13Y and an electrostatic latent image is developed, whereas, when the developing bias is the maximum voltage value V2, the toner receives electrostatic forces toward the developing sleeve 54 and a part of the toner once adhered to the photosensitive drum 13Y returns to the developing sleeve 54.

As shown in FIG. 5B, when the developing bias is the minimum voltage value V1, the carrier receives electrostatic forces toward the developing sleeve 54, whereas, when the developing bias is the maximum voltage value V2, the carrier receives electrostatic forces toward the photosensitive drum 13Y.

Further, it is preferable that the Duty ratio is 50% or larger, because less potential difference Vre weaken the forces for returning toner adhered to the photosensitive drum 13Y, which increases reproductivity of the shallow highlighted portion of the latent image so that the image roughness is improved. When the duty ratio is too large, the fog may greatly deteriorate. Therefore, it is more preferable that the duty ratio is between 50% and 90%.

The distance between the surface of the developing sleeve 54 and the surface of the photosensitive drum 13Y in the developing region is referred to as a developing gap. This developing gap periodically fluctuates with the rotation of the developing sleeve 54 and the photosensitive drum 13Y due to the eccentricity of the developing sleeve 54 and the photosensitive drum 13Y. With the gap fluctuating in this way, the electric field generated by the developing bias applied to the developing sleeve 54 becomes strong when the gap is small and weak when the gap is large.

Accordingly, in the image forming apparatus in which the developing gap fluctuates, when the developing gap is small, an amount of toner moving toward the latent image increases and the density of the image corresponding to that portion becomes high, whereas, when the developing gap is high, an amount of toner moving toward the latent image decreases and the density of the image corresponding to that portion becomes low. As a result, in the image forming apparatus in which the developing gap fluctuates, there is a problem that a periodic image density unevenness occurs with the gap fluctuating.

Figure 6:
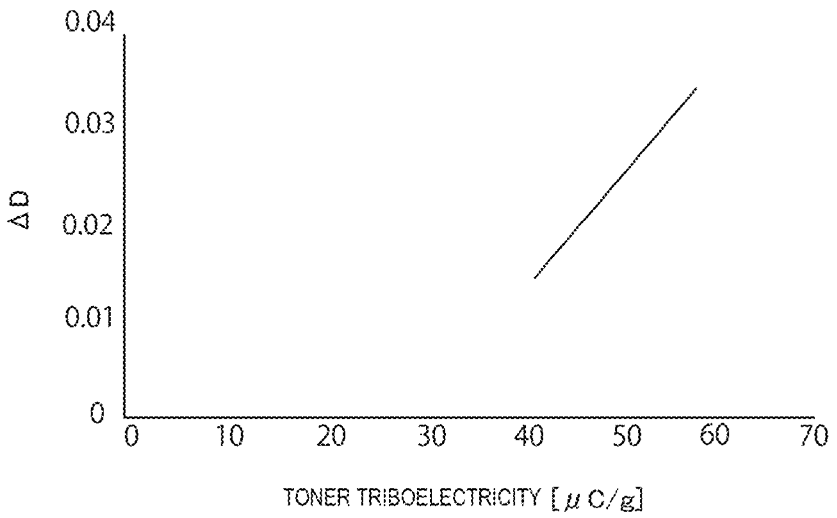
FIG. 6 is a diagram showing a graph showing the relationship between the periodic density unevenness and the toner charging amount, according to the first embodiment of the present invention.

FIG. 6 shows the relationship between the density difference ΔD of the periodic density unevenness and the toner charging amount (toner triboelectricity) μC/g. The density difference ΔD indicates the difference between maximum density and the minimum density when the changing amount of the developing gap is 15 μm. As shown in the graph of FIG. 6 which shows the relationship between the periodic density unevenness and the toner charging amount, the higher the toner charging amount is, the higher the density difference ΔD is and the periodic density unevenness worsens. This is because when the toner charging amount becomes large, the electrostatic adhering force working between toner and carrier becomes large and toner is hard to be separated from the carrier even when the developing gap is large and the electric field generated by the developing bias is weak.

Figure 7:
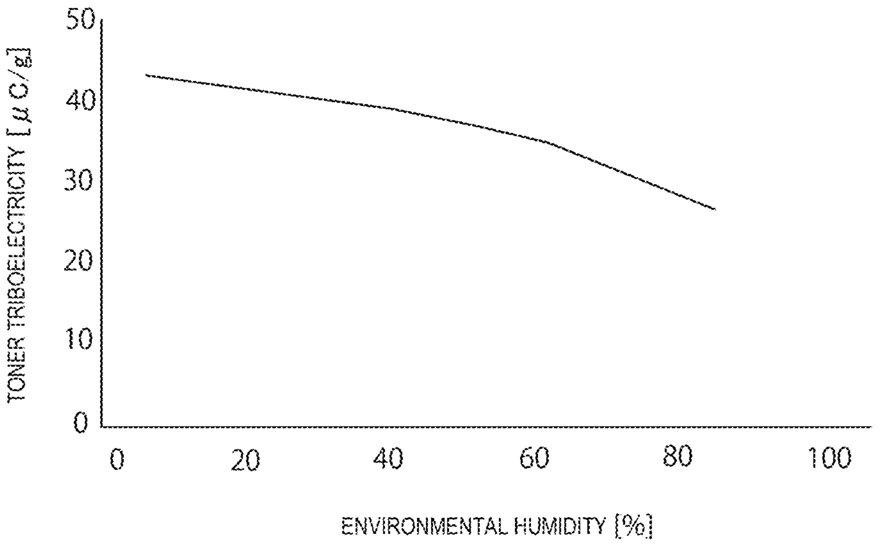
FIG. 7 is a graph showing the relationship between the toner charging amount and the environmental humidity, according to the first embodiment of the present invention.

As shown in the graph of FIG. 7 which shows the relationship between the toner charging amount and the environmental humidity, there is a tendency that the charging amount becomes larger when the environmental humidity becomes less. Namely, the periodic density unevenness tends to occur more easily in a lower humidity environment, even if the changing amount of the developing gap is the same.

As the technology to suppress the periodic density unevenness, which becomes apparent in the low humidity environment, it is generally for the peak-to-peak voltage Vpp to be increased in the low humidity environment as compared with in the high humidity environment.

Figure 8:
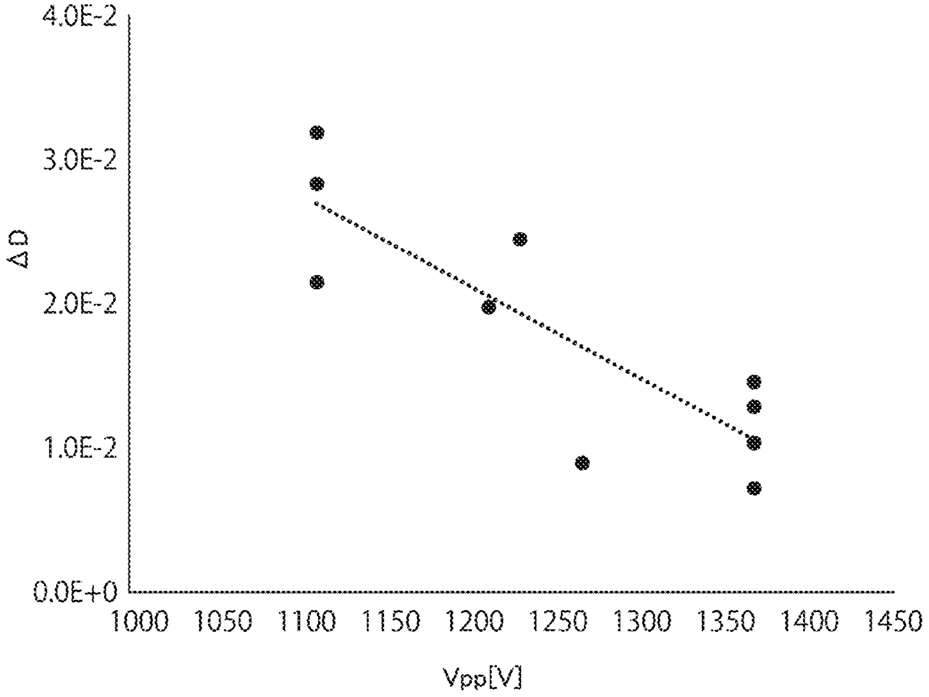
FIG. 8 is a graph showing the relationship between the peak-to-peak voltage of the developing bias and the periodic density unevenness, according to the first embodiment of the present invention.

FIG. 8 is a graph showing the relationship between the peak-to-peak voltage Vpp of the developing bias and the density difference ΔD of the periodic density unevenness. As shown in FIG. 8, the periodic density unevenness tends to become less when the peak-to-peak voltage Vpp of the developing bias increases. This is because it is easier for the toner to be separated from the carrier when the peak-to-peak voltage Vpp increases. In this way, the peak-to-peak voltage Vpp contributes to the separation of the toner from the carrier. Therefore, as indicated in Formulae 3 and 4 below, it is necessary for the force F1 (N) to be applied to the toner during application of the peak-to-peak voltage Vpp to be greater than the adhering force F2 of the toner to the carrier. In the Formulae 3 and 4 below, q denotes the charging amount of toner, d denotes the developing gap.

$$F1 > F2 \quad \text{(Formula 3)}$$

$$F1 = Vpp \times q/d \quad \text{(Formula 4)}$$

Figure 9:
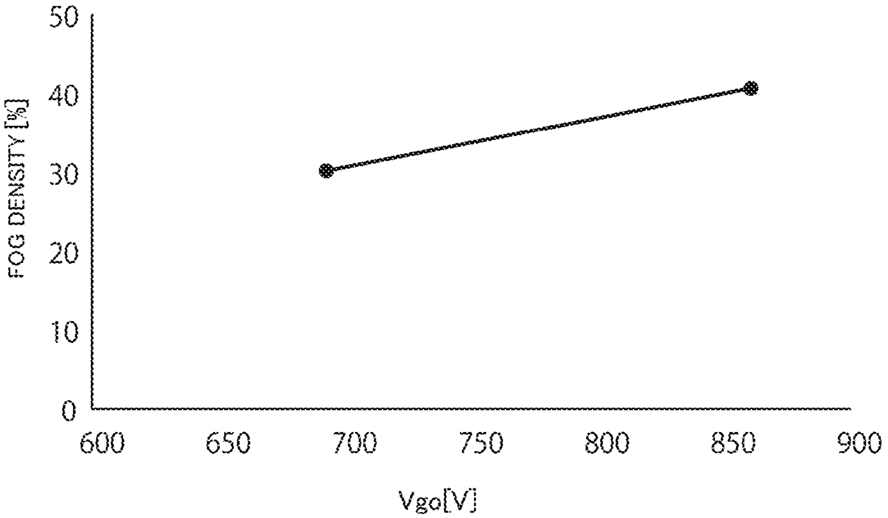
FIG. 9 is a graph showing the relationship between the potential difference between the potential on developing side of AC voltage components and DC voltage components in the developing bias and toner fog, according to the first embodiment of the present invention.

When the peak-to-peak voltage Vpp of the developing bias increases, the potential difference Vgo increases accordingly, which deteriorates the fog as shown in the graph of FIG. 9 which shows the relationship between the potential difference Vgo and the fog. Namely, under the condition that the duty ratio is constant, when the peak-to-peak voltage increases in the low humidity environment to improve the periodic density unevenness, the potential difference Vgo also increases accordingly, so that the problem of the fog in the low humidity environment becomes apparent.

Figure 10:
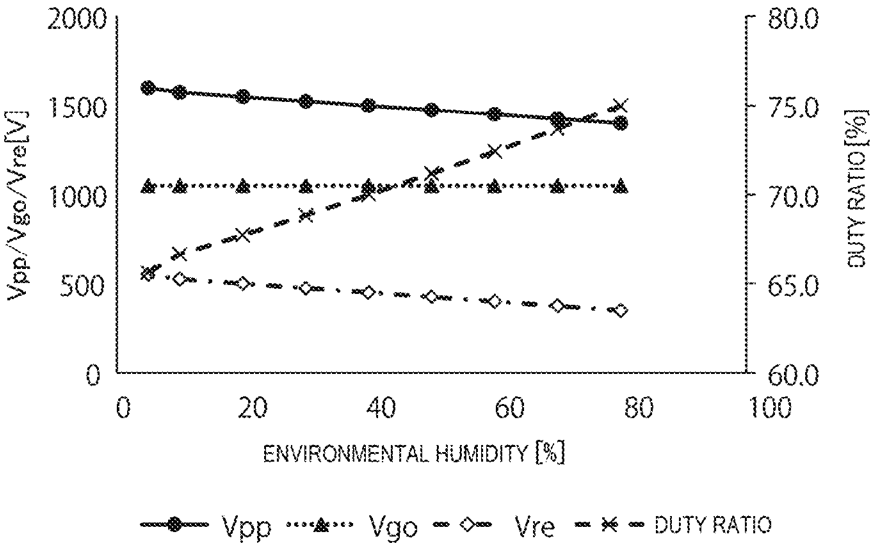
FIG. 10 is a graph showing set voltage of the developing bias and set duty ratio for the environmental humidity, according to the first embodiment of the present invention.

Therefore, in the present embodiment, as shown in the graph of FIG. 10 which shows the voltage of the developing bias and the duty ratio, which are to be set for the environmental humidity, both the periodic density unevenness and the fog are simultaneously suppressed by keeping (maintaining) the potential difference Vgo constant by controlling the peak-to-peak voltage Vpp and the duty ratio in response to the environmental humidity. In the present embodiment, the duty ratio can be changed in units of 0.1%.

FIGS. 11A and 11B are tables showing the configurations of the developing bias the present embodiment and the effects of periodic density unevenness and the fog. The table 1 of FIG. 11A shows the configurations of the developing bias in the present embodiment with the comparative examples 1 and 2. The table 2 of FIG. 11B shows the effects for the periodic density unevenness and the fog by the configurations of the developing bias shown in FIG. 11A with the comparative examples 1 and 2.

As shown in FIGS. 11A and 11B, the comparative example 1 adopts the configuration in which the duty ratio of the developing bias and the peak-to-peak voltage Vpp are fixed at 75% and 1400 (V), respectively, irrespective of the environmental humidity. Therefore, the periodic density unevenness worsens at the environmental humidity being 5% where the toner charging amount becomes large.

In the comparative example 2, the duty ratio is fixed at 75%, but the peak-to-peak voltage Vpp is controlled in response to the environmental humidity such that the less the environmental humidity becomes, the greater the peak-to-peak voltage Vpp becomes. Therefore, different from the comparative example 1, the periodic density unevenness is suppressed irrespective of the environmental humidity, but the potential difference Vgo becomes large and the fog worsens.

In contrast, the present embodiment adopts the configuration in which the less the environmental humidity becomes, the greater the peak-to-peak voltage Vpp and less the duty ratio become, so that the potential difference Vgo is maintained constant at 1050 (V). As a result, the periodic density unevenness and the fog are suppressed simultaneously.

Figure 12:
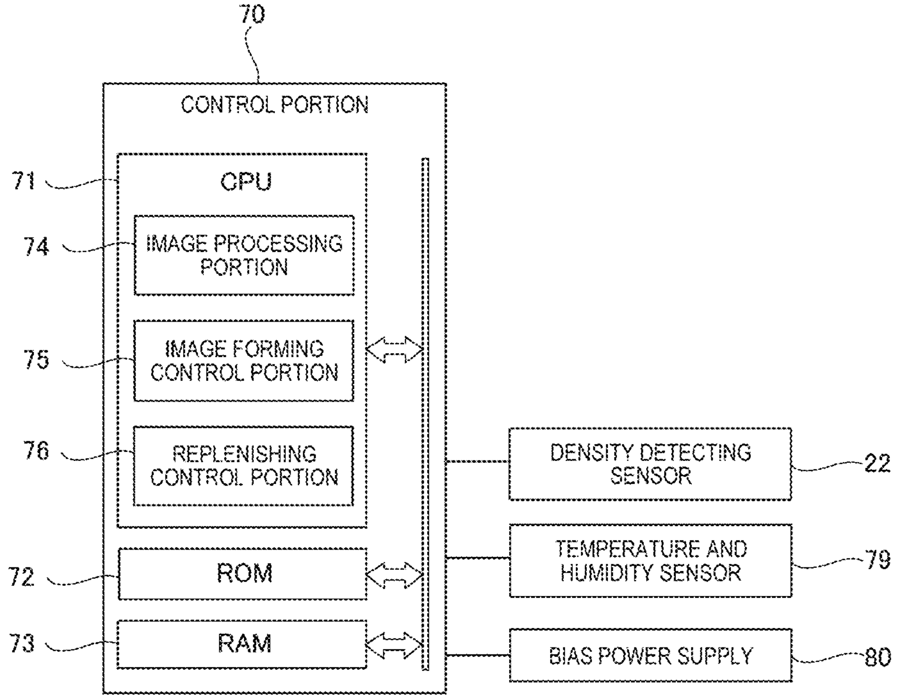
FIG. 12 is a control block diagram of the image forming apparatus, according to the first embodiment of the present invention.

FIG. 12 is a control block diagram of the image forming apparatus 200.

As shown in FIG. 12, the image forming apparatus 200 includes the control portion 70 for performing various controls of the above described image forming operations. The operations of the respective portions of the image forming apparatus 200 are controlled by the control portion 70 provided in the image forming apparatus 200. A series of image forming operations are controlled by the control portion 70 according to the input signals supplied from the operation portion provided on the top surface of the apparatus main body or via a network.

The control portion 70 includes the CPU (Central Processing Unit) 71 as an arithmetic control means, the ROM (Read Only Memory) 72, the RAM (Random Access Memory) 72 and so on. The CPU 71 controls the respective portions of the image forming apparatus 200 while reading out the program corresponding to the working procedures, stored in the ROM 72. The working data and the input data are stored in the RAM 73 and the CPU 71 performs the controls while referring to the data stored in the RAM 73 based on the above described programs and so on.

The control portion 70 includes the image processing portion 74 which processes image information and generates driving signals to the respective portions, the image forming control portion 75 which controls the respective portions, and the replenishing control portion 76 which controls toner replenishment in the developing devices 1Y, 1M, 1C, and 1K.

The temperature and humidity sensor 79 as a humidity detecting means for detecting an environmental humidity and the bias power source 80 which supplies developing biases to the developing devices 1Y, 1M, 1C, and 1K are connected to the control portion 70. The temperature and humidity sensor 79 is provided, for example, at a part of the wall portion of the first conveying path (agitating chamber) 52 to detect information concerning the temperature and humidity inside the developing device 1. The control portion 70 calculates the absolute moisture content inside the developing device 1 based on the information concerning the temperature and humidity inside the developing device 1, which is the detection results of the temperature and humidity sensor 79. Namely, the temperature and humidity sensor 79 detects the information concerning the absolute moisture contents inside the developing container 2.

In the present embodiment, the control portion 70 calculates the information concerning volumetric humidity as the information concerning the absolute moisture content. However, the information concerning the absolute moisture content is not limited to the information concerning volumetric humidity and the control portion 70 may calculate the information concerning the weight absolute humidity.

The control portion 70 determines the developing bias based on the calculated information concerning the absolute moisture content. The bias power supply 80 outputs the developing bias determined by the control portion 70.

The density detecting sensor 22 as a density detecting means for detecting the density of the toner image for adjusting the image density formed on the intermediate transfer belt 10 is connected to the control portion 70. The density detecting sensor 22 irradiates respective patch images formed on the intermediate transfer belt 10 in the image forming portions PY, PM, PC, and PK with a measuring light, and detects the light amount reflected from the respective patch images. The detection result is transmitted to the control portion 70 as a light reception output signal.

An optical sensor having a light emitting element, such as an LED (Light Emitting Diode) and a light receiving element, such as a PD (Photo Diode) is generally used as the density detecting sensor 22. In measuring the toner adhering amount on the intermediate transfer belt 10, when a measuring light is emitted to the toner image from the light emitting element, the measuring light enters the light receiving element as the light reflected from the toner and the light reflected from the belt surface. When the amount of adhering toner is large, the light amount received by the light receiving element decreases since the light reflected from the toner is blocked by the toner. In contrast, when the amount of adhering toner is small, the light amount received by the light receiving element increases as a result the increase of the amount of the light reflected from the belt surface.

The density correction for each color is performed by detecting with the density detecting sensor 22 the density of the patch image for each color based on the output value of the light reception signal, which is based on the received reflected light amount, by comparing the detected density of the patch image with the predetermined reference density, and by adjusting the settings of the exposure device 14. The image density adjustment with the density detecting sensor 22 is performed each time image forming is performed for a predetermined number of sheets. In the present embodiment, the image density adjustment control is performed each time image forming is performed for 500 A4-size sheets.

Figure 13:
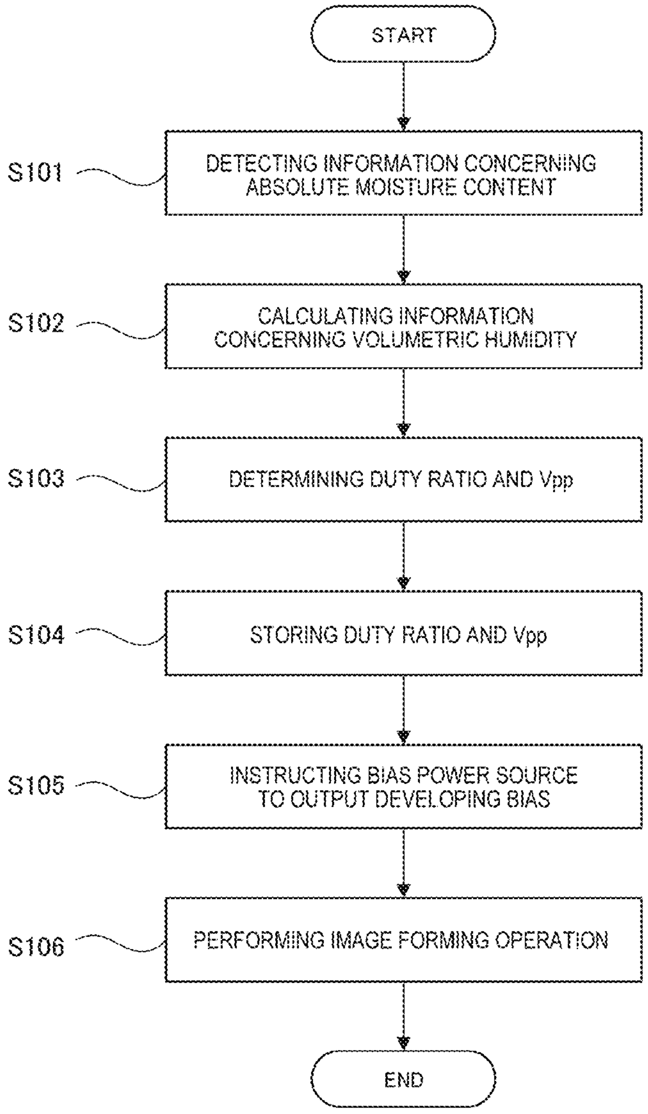
FIG. 13 is a flowchart of the CPU in FIG. 12, showing a procedure of deciding the developing bias, according to the first embodiment of the present invention.

A developing bias determining procedure in the present embodiment will be described according to the flowchart of FIG. 13 executed by the CPU 71. In the following, the procedure will be exemplarily described in a case where an image forming operation signal is input.

When an image forming operation signal is input, the information concerning the absolute moisture content inside the developing container 2 is detected by the temperature and humidity sensor 79 (step S101), and based on this information, the CPU 71 calculates the information concerning the volumetric humidity (step S102).

Next, the peak-to-peak voltage Vpp and the duty ratio of the developing bias are determined such that the potential difference Vgo becomes constant regardless of the environmental humidity as shown in the table 1 of FIG. 11A based on the calculated volumetric humidity (step S103) and this information is stored in the RAM 73 (step S104).

Next, an instruction to output the developing bias with the peak-to-peak voltage Vpp and the duty ratio having been stored in the RAM 73 in step S104 is given to the bias power source 80 (step S105) and an image forming operation is performed (step S106).

In the present embodiment, the two-component developer is exemplarily used as developer; however, the mono-component developer may also be used in applying the present invention.

Second Embodiment

Next, the second embodiment of the present invention will be described.

In the present embodiment, in addition to the control in the first embodiment in which the peak-to-peak voltage Vpp and duty ratio of the developing bias are changed such that the potential difference Vgo is maintained as constant in response to a change in environmental humidity, the potential difference Vback between the charging potential Vd (i.e., the surface potential of the non-image portion) and the DC voltage Vdc (i.e. the potential difference Vback that is the absolute value of the difference between the charging potential Vd and the DC voltage Vdc) is changed simultaneously. The remainder of the configuration is the same as that of the first embodiment and the first embodiment can be referred to for such details.

The phenomenon may occur in which the carrier is separated from the developing sleeve 54 and adheres to the photosensitive drum 13Y during application of the developing bias (hereinafter referred to as carrier adhesion). It is desirable that the carrier adhesion does not occur since an occurrence of the carrier adhesion may lead to abrasion of the photosensitive drum 13' so that the endurance may deteriorate.

Figure 14:
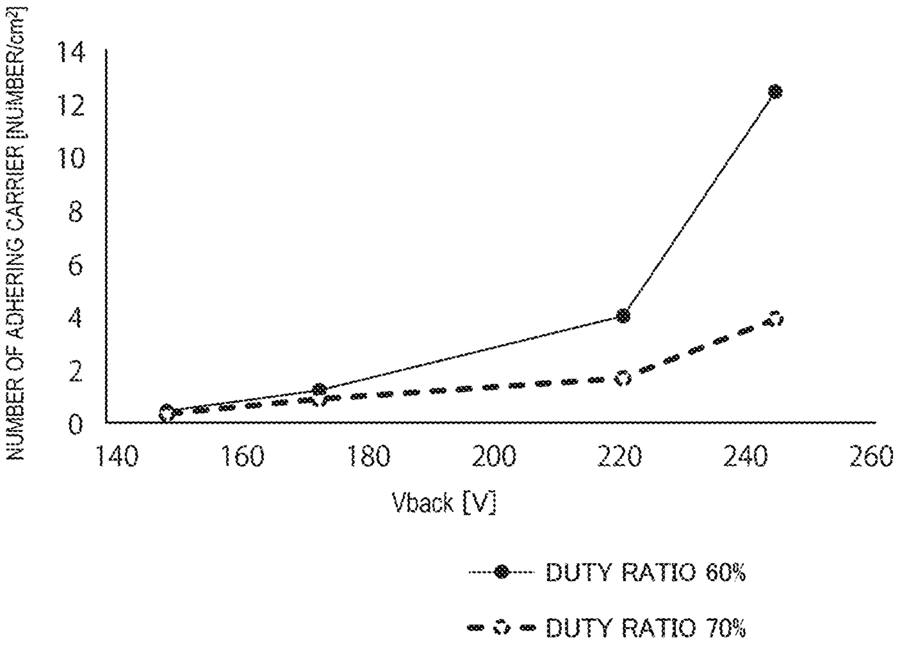
FIG. 14 is a graph showing the relationship between the potential difference Vback and carrier adhesion for different duty ratios, according to the second embodiment of the present invention.

The carrier adhesion is greatly correlated with the duty ratio and the potential difference Vback of the developing bias. FIG. 14 is a graph showing the relationship between the DC voltage Vdc and the carrier adhesion for different duty ratios. The respective potential differences Vgo of the developing bias is 1050 (V) in any cases. The carrier adhering to the photosensitive drum 13Y is collected using an adhesive tape and the value of the carrier adhesion is visually measured by the number of collected carrier per a unit area.

Figure 15:
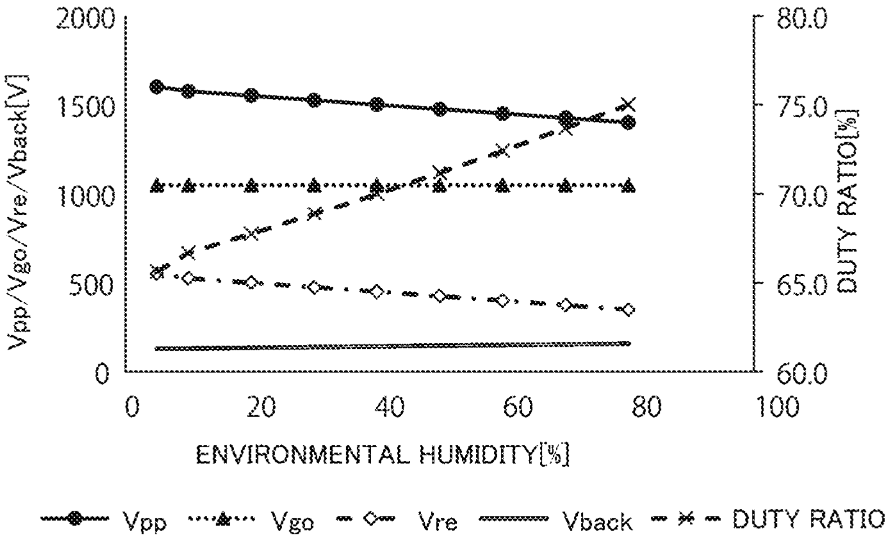
FIG. 15 is a graph showing set voltage of the developing bias and set duty ratios for the environmental humidity, according to the second embodiment of the present invention.

As shown in FIG. 14, the less the duty ratio becomes and the greater the potential difference Vback becomes, the more the carrier adhesion deteriorates. Therefore, when the duty ratio is controlled in response to an environmental humidity as in the first embodiment, the carrier adhesion deteriorates in a low humidity environment in which a duty ratio is low. Therefore, in the present embodiment, as shown in the graph of FIG. 15 in which the developing bias to be set in response to an environmental humidity is shown, the DC voltage in addition to the peak-to-peak voltage Vpp and the duty ratio of the developing bias is simultaneously controlled in response to an environmental humidity. As a result, the periodic the density unevenness, the fog, and the carrier adhesion are suppressed at the same time.

It is desirable for the potential difference Vback to be set between 50 (V) to 200 (V). The reason why the potential difference Vback should be 50 (V) or higher is that there is a possibility that the fog may easily occur when the potential difference Vback is lower than 50 (V) (for example 0 (V)), taking into consideration the potential stability of non-image portion. On the other hand, the reason why the potential difference Vback should be 200 (V) or lower is that there is a concern of the above described carrier adhesion when the potential difference Vback is higher than 200 (V).

FIGS. 16A and 16B are tables showing the configurations of the developing bias and the effects of the periodic density unevenness, the fog, and the number of adhering carrier in the configurations in the present embodiment. The table 3 of FIG. 16A shows the configurations of the developing bias with those of the comparative examples 1 and 2, and the first embodiment. The table 4 of FIG. 16B shows the effects of the periodic density unevenness, the fog, and the carrier adhesion in the configurations of the developing bias of the present embodiment shown with those of the comparative examples 1, 2, and the first embodiment in the table 3 of FIG. 16A. In the following, the description of the effects on the periodic density unevenness and the fog will be omitted because of the duplication with the first embodiment.

The number of carrier adhesion becomes higher when the duty ratio becomes lower as described above. Therefore, in the first embodiment in which the duty ratio becomes less when the environmental humidity becomes lower, the carrier adhesion deteriorates more when the environmental humidity becomes lower. In contrast, in the present embodiment, the CPU 71 of FIG. 12 decreases the potential difference Vback when the environmental humidity is lower. As a result, the periodic density unevenness, the fog, and the carrier adhesion are suppressed for any environmental humidity.

Third Embodiment

Next, the third embodiment of the present invention will be described.

In the first and second embodiments, even if the settings of the peak-to-peak voltage Vpp and the duty ratio, and the DC voltage Vdc of the developing bias are changed in response to a change in the environmental humidity, the charging amount of the toner is not immediately changed, but it gradually changed to the value being adapted to the environment by being agitated in the developing device. Therefore, when the settings of the developing bias are changed, only the developing characteristics are changed with the toner charging amount being the same, so that the densities of respective tones are changed.

For example, when the humidity in the developing device 1 changes from 50% to 30%, while the developing device 1 is in the halt state, the peak-to-peak voltage Vpp and the duty ratio are changed in the settings of the developing bias in next operation state, but the toner in the developing device in the state where the operation is halted is not agitated and the toner charging amount is maintained at the value for the humidity of 50% before the humidity changes.

Figure 17:
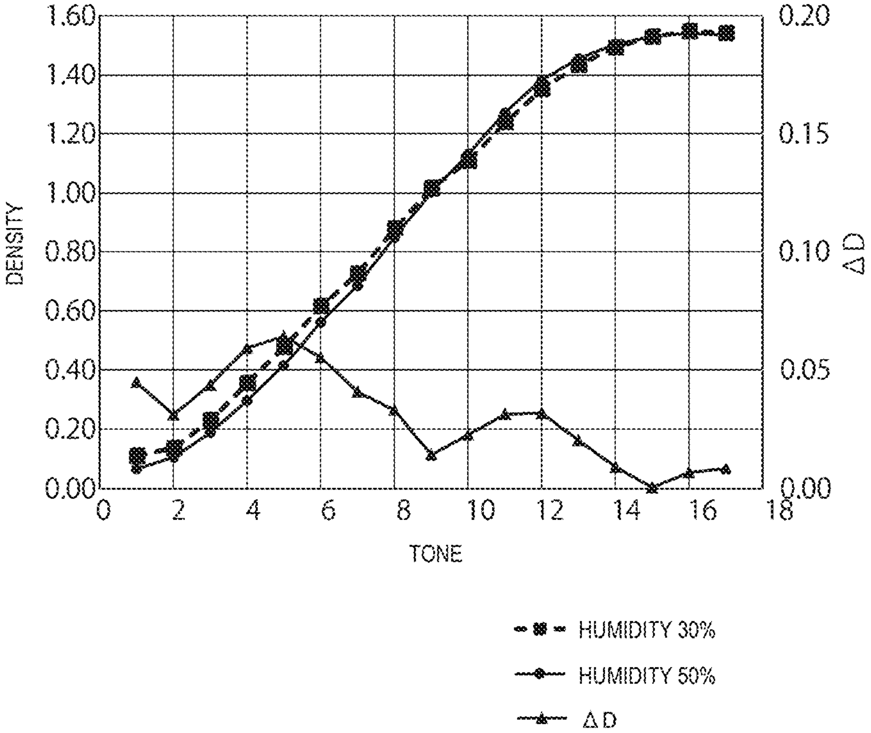
FIG. 17 is a graph showing changes in density for respective tones when setting of the developing bias is changed, according to the third embodiment of the present invention.

Therefore, only the settings of developing bias are changed with the toner charging amount being not changed and the developing characteristics of the toner to the photosensitive drum 13 are changed. As a result, the densities of respective tones of the output recording material are changed as shown in the graph of FIG. 17 that shows density changes for respective tones when the settings of the developing bias are changed. In this case, the density change ΔD increases, especially in the low density area (0.3 to 0.6). If an increase in the density change ΔD occurs in the developing devices 1Y, 1M, 1C, and 1K, the change of tint of the image with the combination of four colors occurs.

Therefore, in the present embodiment, the occurrence of a change of tint in a case where the settings of the developing bias are changed is intended to be suppressed. The remainder of the configuration is the same as those of the first and second embodiments and those embodiments can be referred to for such details.

Even in the first and second embodiments, for example, when the image forming apparatus operates longer in a room in which the humidity is 50%, the temperature in the apparatus rises and the humidity in the developing device gradually changes from 50% to 30%. In this case, the settings of the developing bias are gradually changed according to the change in humidity. Therefore, the density change ΔD is small when the bias is changed. However, when the apparatus is not used at night, for example, the apparatus does not operate for a long time. In such a case, the humidity in the developing device returns to 50% and when the settings of the developing bias are greatly changed at one time in the next operation state, the density change ΔD becomes greater because the toner amount does not change during the operation halt time.

In the present embodiment, the maximum values of the ranges of change in peak-to-peak voltage Vpp and the duty ratio of the developing bias are set for a single time. When the ranges of change in the developing bias according to the humidity change are greater than the maximum values, the developing bias is changed in multiple times, so that the density change ΔD is reduced when the developing bias is changed.

In the present embodiment, the CPU 71 of FIG. 12 sets the maximum value for the range of change in the duty ratio of the developing bias in a single time as the predetermined value of 0.5% (Vpp=10 (V)), and the next change is performed after a predetermined image formation such as the image formation for 1000 sheets from the time of the previous change.

Figure 18:
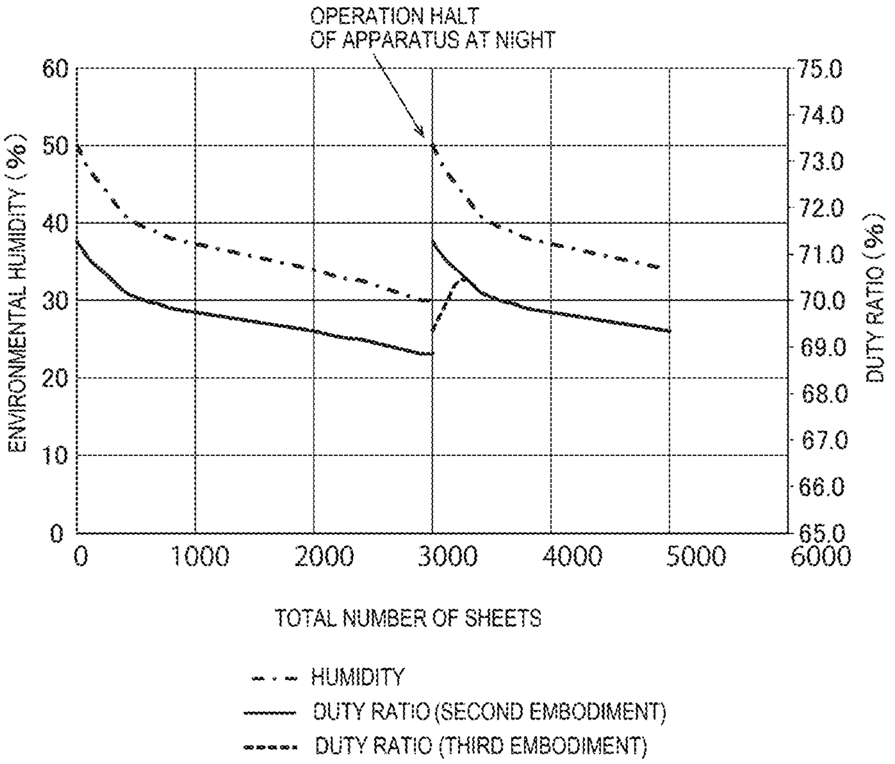
FIG. 18 is a graph showing set duty ratios of the developing bias for the environmental humidity, according to the third embodiment of the present invention.

FIG. 18 is a graph showing set duty ratios of the developing bias for the environmental humidity. In FIG. 18, when 3000 sheets are output continuously in a room in which the humidity is 50%, the operation is halted until the next day, and the continuous output is performed again, the settings of the duty ratio of the developing bias for humidity change in the present embodiment and the second embodiment are shown. Further, in the present embodiment, in addition to the changes in the duty ratio, the peak-to-peak voltage and the potential difference Vback are also changed simultaneously as in the second embodiment.

Figure 19:
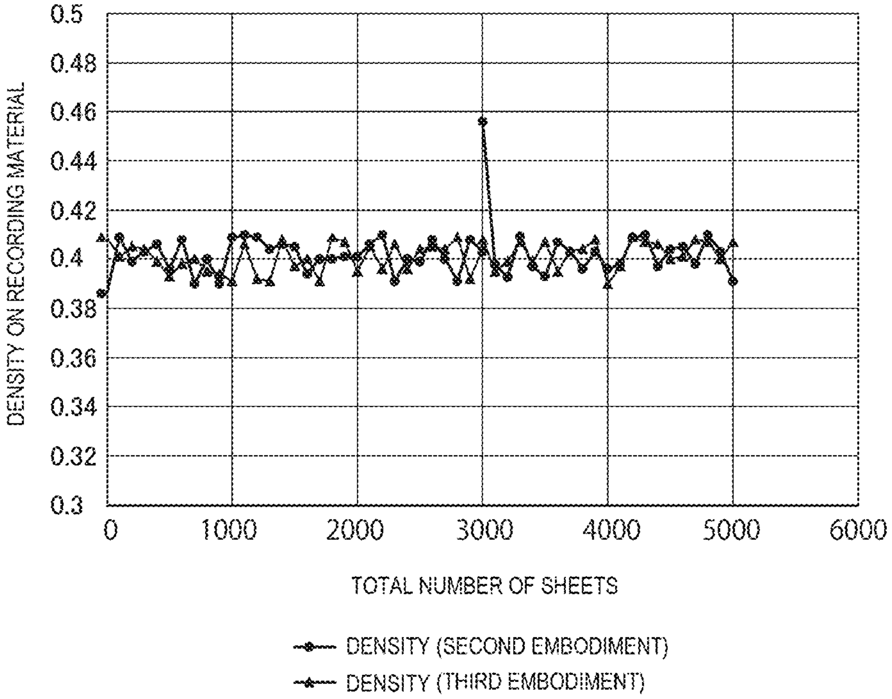
FIG. 19 is a graph showing density transition of an image on a recording material when setting of the developing bias is changed, according to the third embodiment of the present invention.

In the second embodiment, the duty ratio is greatly changed in response to the humidity change the next day after the 3000 sheets are output, whereas in the third embodiment, the duty ratio is changed stepwise. In the graph of FIG. 19 which shows the density transition of an image on a recording material when setting of the developing bias is changed, the density transition of an image with the density 0.4 on the recording material is shown. The maximum value of the density change ΔD when the developing bias is changed is 0.06 in the second embodiment, whereas the maximum value of the density change ΔD is reduced to 0.012 and the change in tint can be suppressed in the third embodiment.

Fourth Embodiment

Next, the fourth embodiment of the present invention will be described.

In the present embodiment, the change in tint when the settings of the developing bias are changed is intended to be suppressed by changing the settings of the developing bias in response to the environmental humidity only immediately before the image density adjustment control using the density detecting sensor. The remainder of the configuration is the same as those of the first, second, and third embodiments and those embodiments can be referred to for such details.

Figure 20:
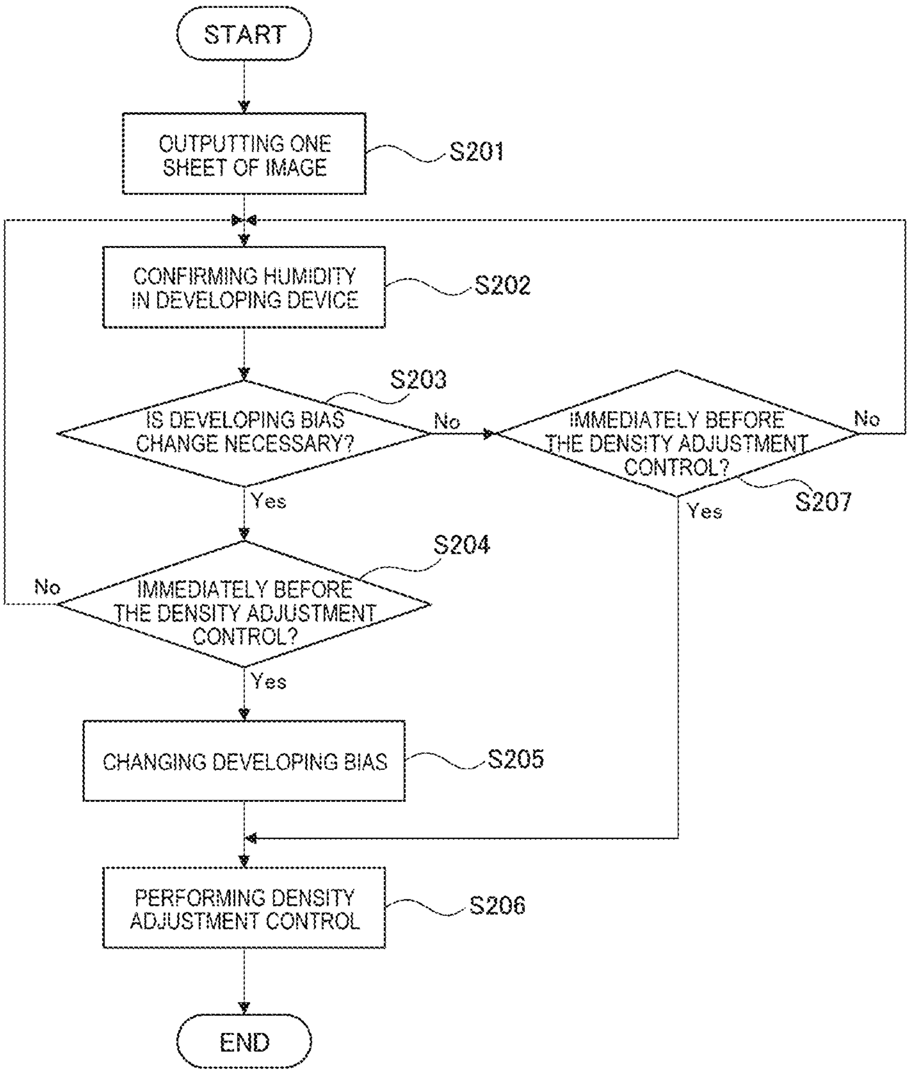
FIG. 20 is a flowchart the CPU in FIG. 12 performs, according to the fourth embodiment of the present invention.

The operation of the present embodiment will be described referring to the flowchart of FIG. 20 executed by the CPU 71 in FIG. 12.

After outputting a sheet of image (step S201), the humidity in the developing device is detected using the temperature and humidity sensor 79 (step S202). Whether it is necessary to change the settings of the developing bias in response to the humidity in the developing device detected by the temperature and humidity sensor 79 is judged (step S203). When it is judged that it is necessary to change the settings of the developing bias (step S203), whether the present time is immediately before the image density adjustment control, which is performed every 500 sheets is judged (step S204). When it is judged that the present time is immediately before the image density adjustment control (step S204), the settings of the developing bias are changed (step S205), and then the image density adjustment control is performed (step S206).

On the other hand, when it is judged that the present time is not immediately before the image density adjustment control (step S204), the sequence returns to step S202 without changing the developing bias and the humidity in the developing device is detected by the temperature and humidity sensor 79.

Further, when it is judged that it is not necessary to change the settings of the developing bias (step S203), the sequence goes to step S207 where whether the present time is immediately before the image density adjustment control is judged. When it is judged that the present time is immediately before the image density adjustment control (step S207), the sequence goes to step S206 where only the image density adjustment control is performed.

Figure 21:
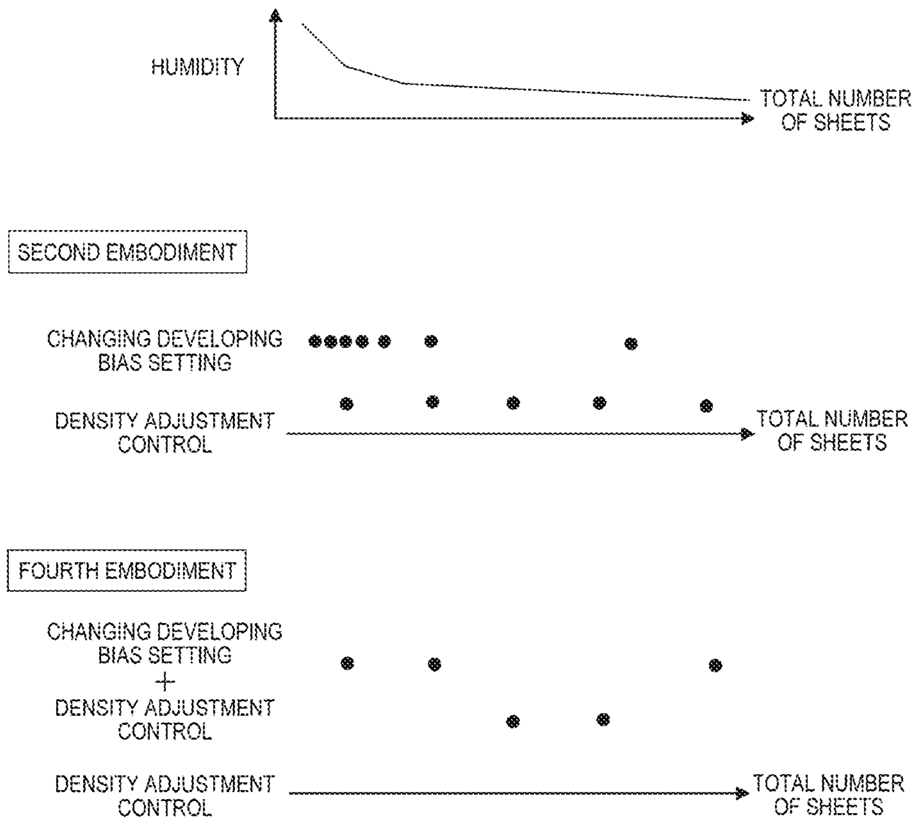
FIG. 21 is a graph showing the timing of performing changes of setting of the developing bias and image density adjustment control, according to the fourth embodiment of the present invention.

FIG. 21 is a graph showing the timing of performing changes of settings of the developing bias and image density adjustment control in the present embodiment and the second embodiment. As shown in FIG. 21, in the second embodiment, when the humidity change is great, the developing bias is frequently changed and the change in tint occurs every time the developing bias is changed. In the present embodiment, even when the humidity changes, the developing bias is not changed until the next image density adjustment control and the developing bias is changed immediately before the image density adjustment control. In this case, the range of change of the developing bias per a single time might be greater than that in the second embodiment, the change in tint can be reduced because the image density adjustment control is performed in conformity with the changed developing bias.

Fifth Embodiment

Next, the fifth embodiment of the present invention will be described.

In the third and fourth embodiments, the change in tint when the developing bias is changed can be reduced; however, the influence on the change of the developing bias does not disappear. The problem of the periodic density unevenness is conspicuous when an image with high image printing ratio is output. In contrast, when images with low image printing ratio are dominant, the necessity for changing developing bias is low.

Therefore, the present embodiment has the tint change priority mode, in which the developing bias is not changed even if the humidity in the developing device changes, and the on-surface density unevenness priority mode, in which the developing bias is changed if the humidity in the developing device changes. One of these modes can be freely selected. The remainder of the configuration is the same as those of the first, second, third and fourth embodiments and those embodiments can be referred to for such details.

In the present embodiment, a button for a user to freely select one of the tint change priority mode and the on-surface density unevenness priority mode is provided on the operation portion of the image forming apparatus 200. The CPU 71 in FIG. 12 switches between the tint change priority mode and the on-surface density unevenness priority mode in response to the selecting operation using the button.

In the above respective embodiments, the description is made when the image forming apparatus is a printer. However, the present invention can be applied to a copying machine, a facsimile device, or a multi-function machine with these multiple functions.

In the above respective embodiments, the case where the potential difference Vgo is 1050 (V) is exemplarily described. However, even if the potential difference Vgo is not 1050 (V), as long as the potential difference Vgo is constant regardless of the environmental humidity, the similar effects can be expected. The meaning that the potential difference Vgo is constant regardless of the environmental humidity includes the case where the potential difference Vgo fluctuates with ±5% with respect to the reference value in response to a change in the environmental humidity as long as the relationship is met in which the less the environmental humidity is, the greater the peak-to-peak voltage Vpp is set and the less the duty ratio is set.

For example, in the above first embodiment, the case is exemplarily described in which when the environmental humidity is 80%, the peak-to-peak voltage Vpp is 1400 (V), the potential difference Vgo is 1050 (V), and the duty ratio is 75% (refer to FIG. 11A). However, the configuration is not limited to this case. The modification example is also possible in which, when the environmental humidity is 80%, the peak-to-peak voltage Vpp is 1400 (V), the potential difference Vgo is 1000 (V), and the duty ratio is 71.4% and when the environmental humidity is 50%, the peak-to-peak voltage Vpp is 1475 (V), the potential difference Vgo is 1050 (V), and the duty ratio is 71.2%, like the above first embodiment. In this modification example, although the potential differences Vgo are not the same between the environmental humidity 80% and 50%, the relationship is met in which, when the environmental humidity is 50%, the peak-to-peak voltage Vpp is greater and the duty ratio is less than that in the case where the environmental humidity is 80%.

In the above respective embodiments, the combinations of the environmental humidity, the peak-to-peak voltage Vpp, the duty ratio, and the potential difference Vback are not limited to those indicated in FIGS. 10, 11A, 15, and 16A. For example, the developing bias when the environmental humidity is 50% in the second embodiment can have the configuration in which the peak-to-peak voltage Vpp is 1500 (V), the duty ratio is 70%, the potential difference Vgo is 1050 (V), and the potential difference Vback is 140 (V).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-096154, filed Jun. 12, 2023 and No. 2024-035619, filed Mar. 8, 2024, which are hereby incorporated by reference herein in their entirety.

What is claimed is:

1. An image forming apparatus comprising:

an image bearing member;

a charging portion that charges a surface of the image bearing member to a predetermined charging potential;

a latent image forming portion that forms an electrostatic latent image on the surface of the image bearing member charged by the charging portion to the predetermined charging potential;

a developer bearing member that bears developer including toner;

a developing bias applying portion that applies a developing bias to the developer bearing member to develop the electrostatic latent image formed on the image bearing member by the latent image forming portion using the developer borne by the developer bearing member, the developing bias including a direct current voltage and an alternating current voltage that are superimposed on each other; and a humidity sensor that detects humidity, wherein, when a voltage on the same-polarity side of a charging polarity of the toner with respect to the direct current voltage out of the alternating current voltage is referred to as Vgo, a voltage on the opposite-polarity side of the charging polarity of the toner with respect to the direct current voltage out of the alternating current voltage is referred to as Vre, and a peak-to-peak voltage of the alternating current voltage is referred to as Vgo+Vre, the developing bias applying portion applies the developing bias to the developer bearing member;

so that as compared to the peak-to-peak voltage in a case where humidity detected by the humidity sensor is a first humidity, the peak-to-peak voltage in a case where humidity detected by the humidity sensor is a second humidity that is lower than the first humidity is greater, and so that the voltage Vgo in the case where the humidity detected by the humidity sensor is the second humidity is the same as the voltage Vgo in the case where the humidity detected by the humidity sensor is the first humidity.

2. The image forming apparatus according to claim 1, wherein the developer borne by the developer bearing member includes toner and carrier, and wherein, when the predetermined charging potential is referred to as Vd, the direct current voltage is referred to as Vdc, and an absolute value of a difference between the potential Vd and the voltage Vdc is referred to as Vback, the developing bias applying portion applies the developing bias to the developer bearing member so that the value Vback in the case where humidity detected by the humidity sensor is the second humidity is lower than the value Vback in the case where humidity detected by the humidity sensor is the first humidity.

3. The image forming apparatus according to claim 1, wherein, when the duty ratio in one cycle of the alternating current voltage is referred to as Vgo/(Vgo+Vre), the duty ratio in the case where humidity detected by the humidity sensor is the first humidity is between 50% and 90%, and the duty ratio in the case where humidity detected by the humidity sensor is the second humidity is between 50% and 90%.

4. The image forming apparatus according to claim 1, further comprising a developing container that accommodates the developer, wherein the humidity sensor detects humidity in the developing container.

5. An image forming apparatus comprising:

an image bearing member;

a charging portion that charges a surface of the image bearing member to a predetermined charging potential;

a latent image forming portion that forms an electrostatic latent image on the surface of the image bearing member charged by the charging portion to the predetermined charging potential;

a developer bearing member that bears developer including toner;

a developing bias applying portion that applies a developing bias to the developer bearing member to develop the electrostatic latent image formed on the image bearing member by the latent image forming portion using the developer borne by the developer bearing member, the developing bias including a direct current voltage and an alternating current voltage that are superimposed on each other; and a humidity sensor that detects humidity, wherein, when a voltage on the same-polarity side of a charging polarity of the toner with respect to the direct current voltage out of the alternating current voltage is referred to as Vgo, a voltage on the opposite-polarity side of the charging polarity of the toner with respect to the direct current voltage out of the alternating current voltage is referred to as Vre, a peak-to-peak voltage of the alternating current voltage is referred to as Vgo+Vre, and the duty ratio in one cycle of the alternating current voltage is referred to as Vgo/(Vgo+Vre), the developing bias applying portion applies the developing bias to the developer bearing member;

so that as compared to the peak-to-peak voltage in a case where humidity detected by the humidity sensor is a first humidity, the peak-to-peak voltage in a case where the humidity detected by the humidity sensor is a second humidity that is lower than the first humidity is greater, and so that the duty ratio in the case where humidity detected by the humidity sensor is the second humidity is less than the duty ratio in the case where humidity detected by the humidity sensor is the first humidity.

6. The image forming apparatus according to claim 5, wherein the developing bias applying portion applies the developing bias to the developer bearing member so that the voltage Vgo in the case where humidity detected by the humidity sensor is the second humidity is the same as the voltage Vgo in the case where humidity detected by the humidity sensor is the first humidity.

7. The image forming apparatus according to claim 5, wherein the developer borne by the developer bearing member includes toner and carrier, and wherein, when the predetermined charging potential is referred to as Vd, the direct current voltage is referred to as Vdc, and an absolute value of a difference between the potential Vd and the voltage Vdc is referred to as Vback, the developing bias applying portion applies the developing bias to the developer bearing member so that the value Vback in the case where humidity detected by the humidity sensor is the second humidity is lower than the value Vback in the case where humidity detected by the humidity sensor is the first humidity.

8. The image forming apparatus according to claim 5, wherein the duty ratio in the case where humidity detected by the humidity sensor is the second humidity is equal to 50% or higher.

9. The image forming apparatus according to claim 5, wherein the duty ratio in the case where humidity detected by the humidity sensor is the first humidity is equal to 90% or lower.

10. The image forming apparatus according to claim 5, further comprising a developing container that accommodates the developer, wherein the humidity sensor detects humidity in the developing container.

* * * * *